Nov. 18, 1941.  D. B. BAKER ET AL  2,262,876
VEHICLE
Filed Dec. 29, 1939      4 Sheets-Sheet 1
Fig. 1
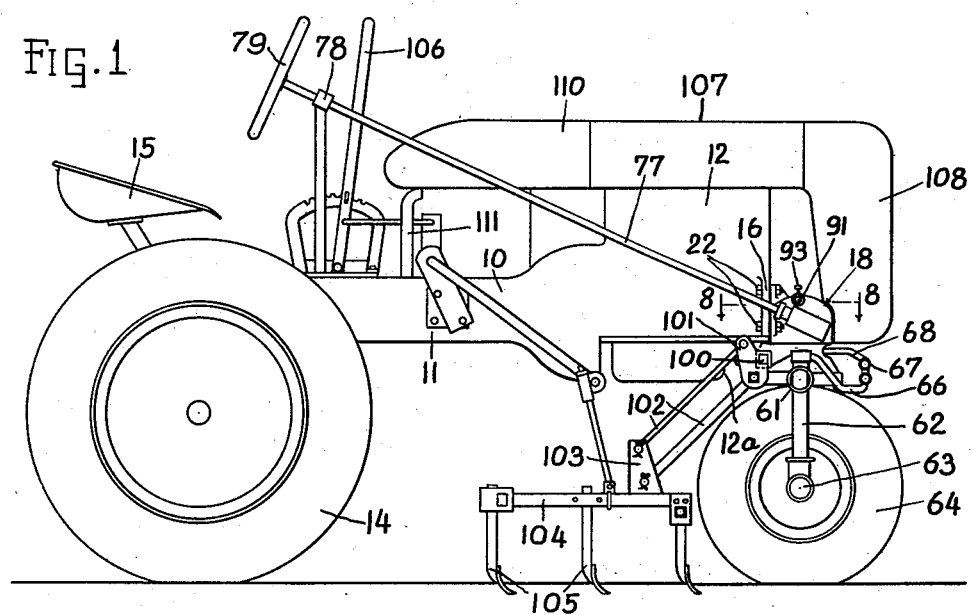
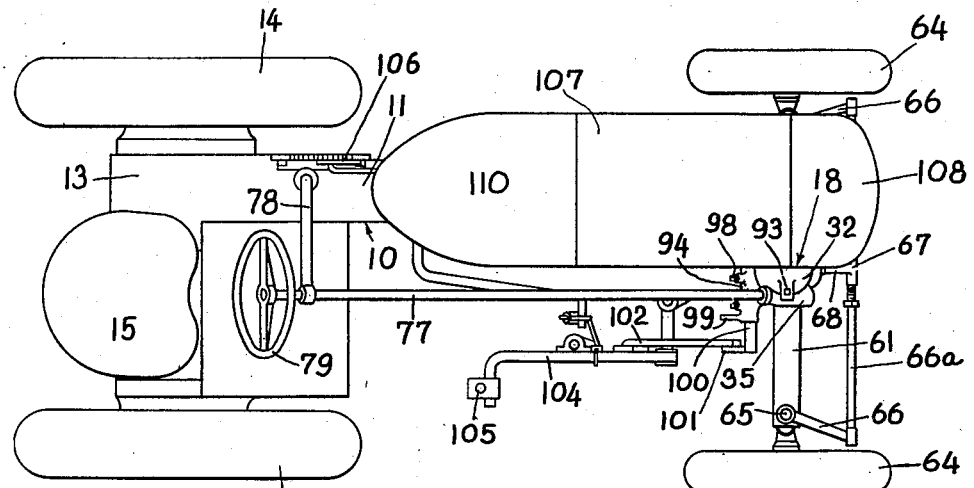
Fig. 2
INVENTORS
D. B. BAKER
W. C. ROSENTHAL
By Paul O. Pippel
ATTY.

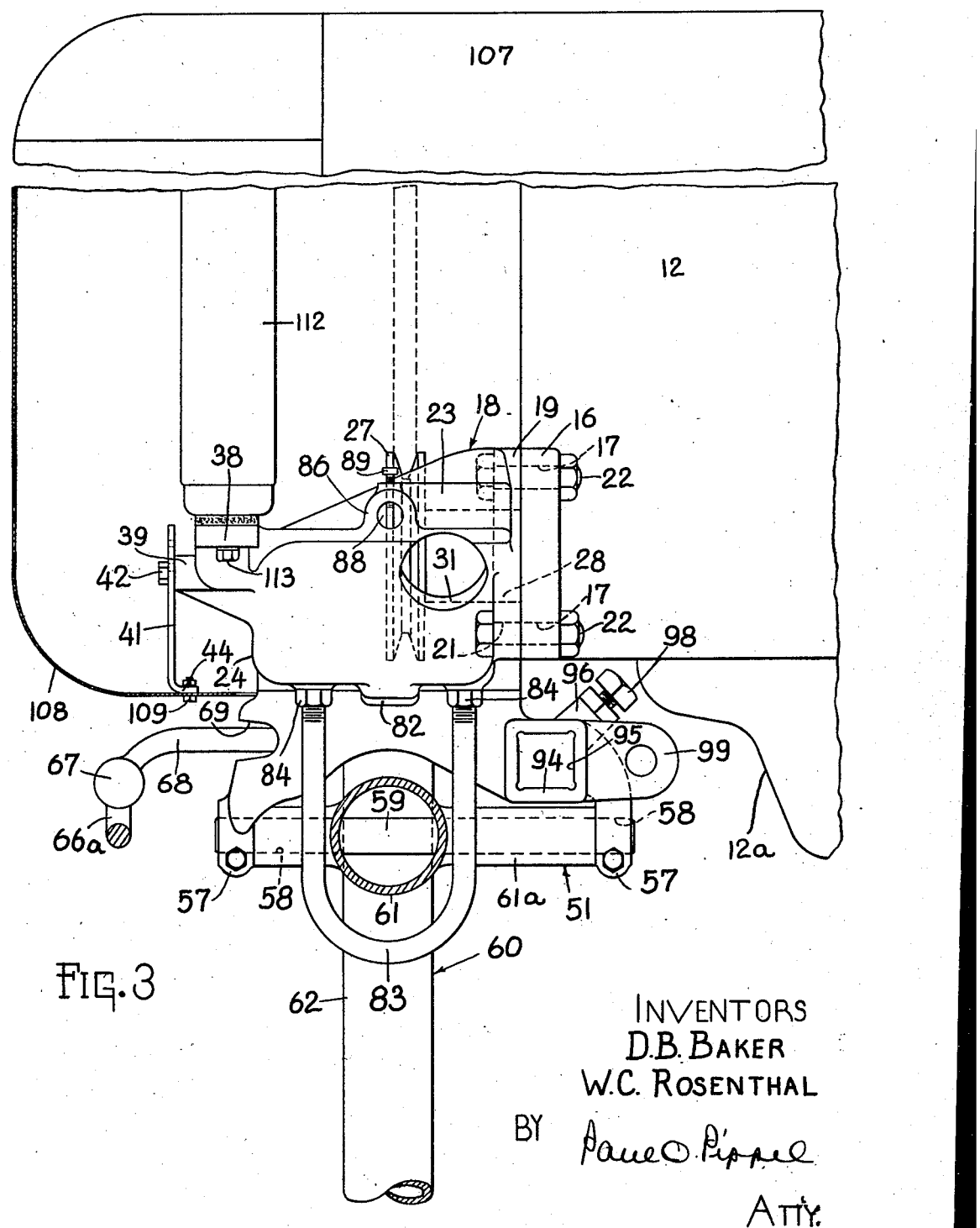

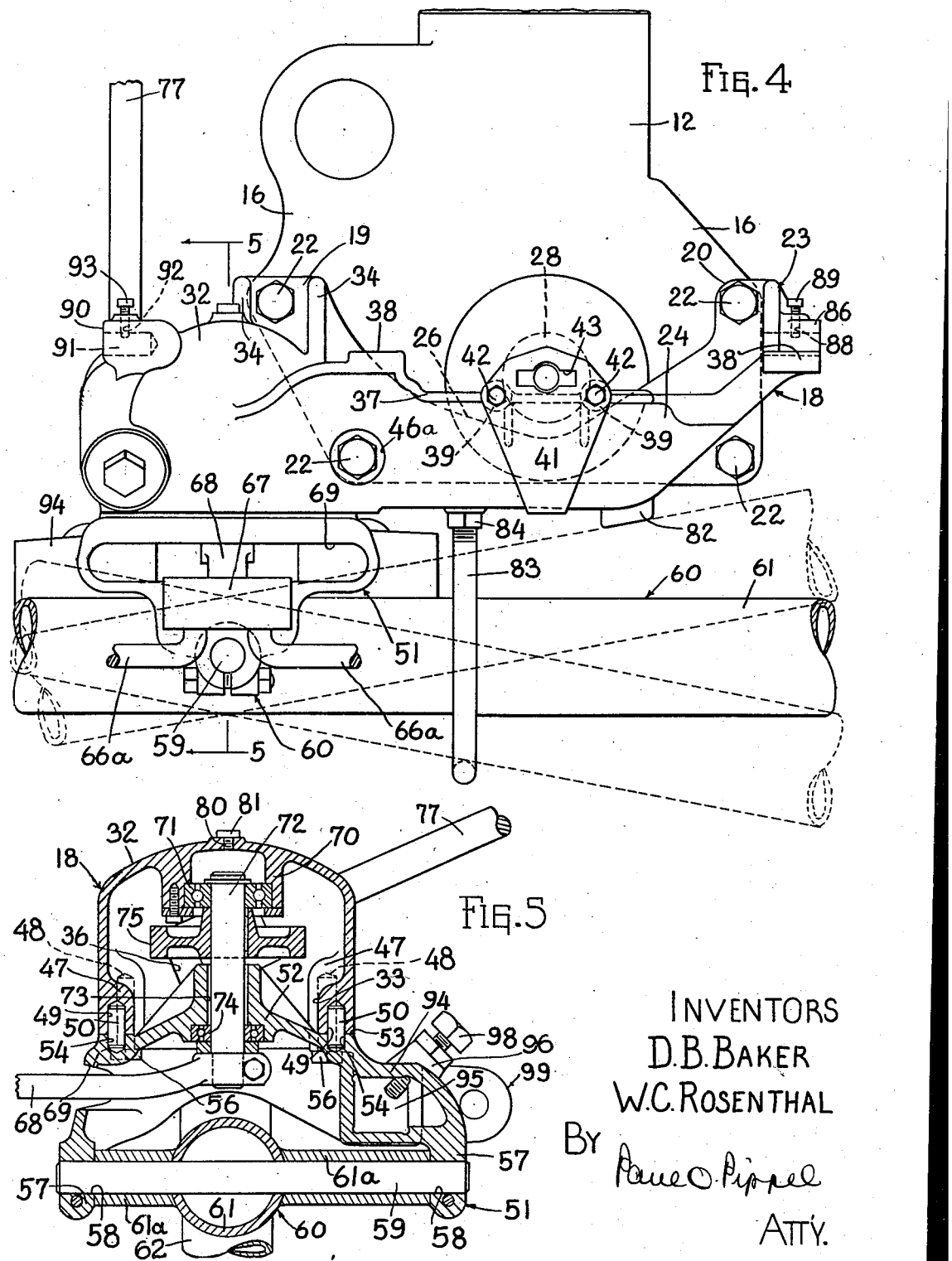

Nov. 18, 1941.    D. B. BAKER ET AL    2,262,876
VEHICLE
Filed Dec. 29, 1939    4 Sheets-Sheet 4
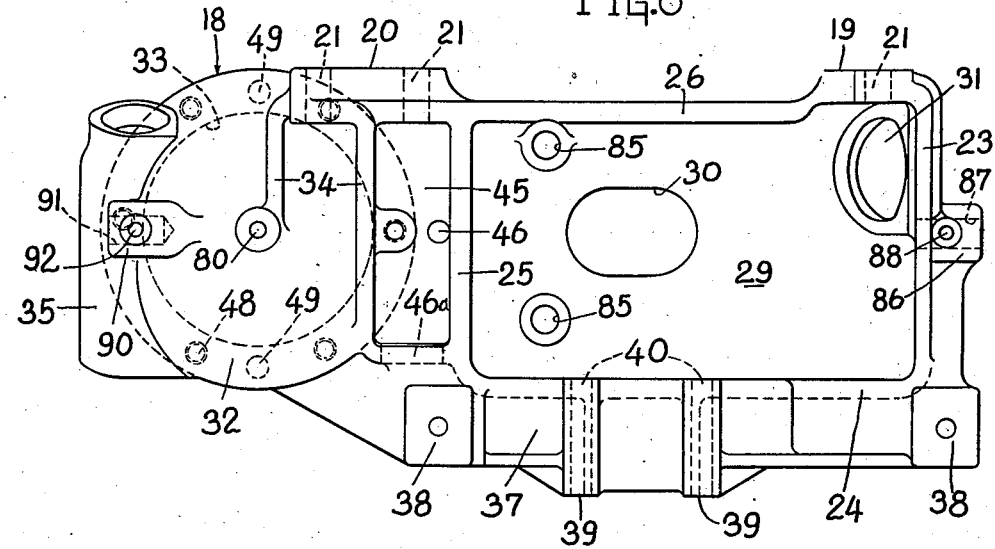
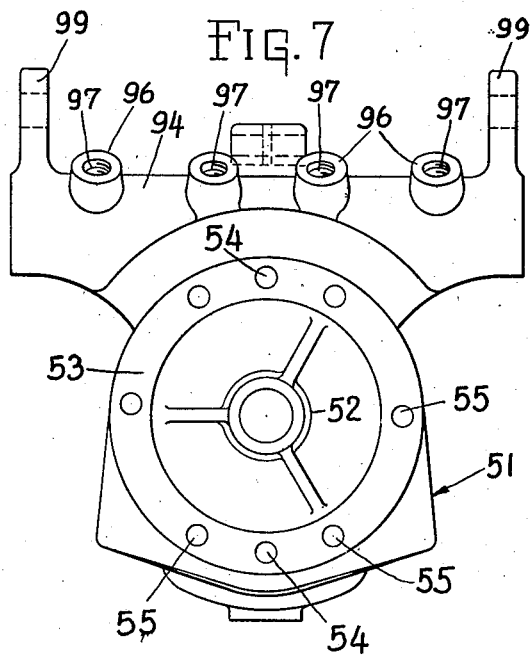
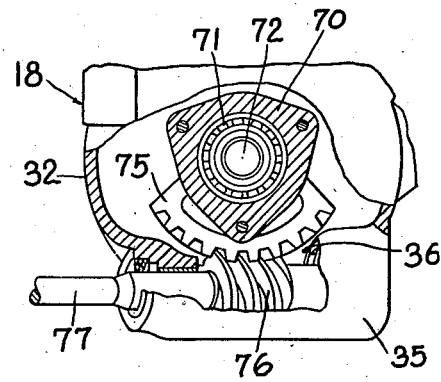
INVENTORS
D. B. BAKER
W. C. ROSENTHAL
BY Paul O Pippel
ATTY.

Patented Nov. 18, 1941

2,262,876

UNITED STATES PATENT OFFICE 2,262,876

VEHICLE

David B. Baker, Riverside, and William C. Rosenthal, Chicago, Ill., assignors to International Harvester Company, a corporation of New Jersey Application December 29, 1939, Serial No. 311,623

14 Claims. (Cl. 180—1)

This invention relates to a vehicle, and more particularly to an improved front end construction for a vehicle of the tractor type.

The invention contemplates particularly an improved unit-construction for a tractor of the type disclosed in assignee's copending application, Serial No. 242,239, filed November 25, 1938. The tractor illustrated therein is of the type commonly known as the frameless type, wherein the tractor body comprises a number of housing portions secured together in longitudinal alinement, the rear final drive housing being connected to the tractor rear axle structure. In tractors of this type considerable disadvantages have existed in connection with the provision of a suitable front end construction for mounting the forward end of the body on the front axle structure. Such a tractor body also provides a problem with respect to providing suitable attaching portions to which may be attached auxiliary elements, such as agricultural implements or the like.

The present invention contemplates and has for its principal object the provision of an improved front end construction for a vehicle, wherein there is provided a novel arrangement of structural members for supporting the forward end of the vehicle body on a front wheel assembly or structure.

An important object is to provide a structural unit with cooperating housing portions adapted to contain steering mechanism for the front wheels of the vehicle.

Another important object is to provide the structural members with attaching portions to which auxiliaries and implements may be attached.

Another object is to provide means for mounting auxiliaries in a suitable location forwardly and below the lower portion of the vehicle power plant.

Another object is to provide a front end construction on which a front axle structure is mounted for vertical oscillating movement about a longitudinal pivot axis, the construction including means for limiting such vertical movement in both directions.

Another object is to provide a front end construction providing a compact arrangement including means for supporting the vehicle radiator and the grille and hood structure therefor.

And, another object is to provide a simplified arrangement wherein the vehicle power plant includes flange portions to which are rigidly secured flange portions provided on a unitary structural unit.

Briefly and specifically, these and other important objects are achieved in one preferred form of the invention wherein the tractor consists of a longitudinal body having a forwardly disposed power plant at the front end of which is rigidly secured the improved front end construction. This construction comprises a pair of structural members. One member is rigidly secured to the forward portion of the power plant and the other member is secured to the first member; and the first member includes a housing portion containing steering mechanism for a front axle structure carried by the second member. Each member includes a plurality of attaching portions to which auxiliaries, such as implements and the like, may be attached.

A more complete understanding of these and other desirable objects of the invention may be had from the following detailed description taken in conjunction with the accompanying sheets of drawings, in which:

Figure 1 is a side elevational view of a tractor embodying the improved construction;

Figure 2 is a plan view of the same;

Figure 3 is an enlarged side elevational view, partly in section, of a forward portion of the vehicle;

Figure 4 is a front end elevational view of the same, certain parts being omitted;

Figure 5 is a vertical sectional view taken substantially along the line 5—5 of Figure 4, illustrating the housing and steering mechanism;

Figure 6 is a detailed plan view of one of the structure members;

Figure 7 is a detailed plan view of a complementary structural member; and,

Figure 8 is a sectional view taken substantially on the line 8—8 of Figure 1, and illustrating the worm and sector connection for the steering mechanism.

The tractor chosen for the purpose of illustration is of the agricultural type including a generally narrow longitudinal body 10, consisting of a rearward portion 11 and a forwardly disposed engine or power plant 12. The rearward end of the body is appropriately supported on a rear axle housing structure 13 including a pair of transversely spaced drive wheels 14. The tractor illustrated is of the offset type wherein the body is positioned laterally to one side of the center line between the wheels 14. The rear axle structure carries a suitable seat 15 located laterally to the other side of the center line between the wheels 14. This particular tractor construction forms the basis of the application previously referred to.

The front portion of the tractor body 10 is supported on the improved front end construction according to the present invention. A forward portion of the power plant 12 is provided with a pair of laterally extending, vertically disposed flange portions 16. Each flange is provided with a pair of vertically spaced bolt-receiving openings 17. A structural member 18, preferably in the form of a one-piece casting, is disposed transversely across the front end of the body 10 and includes a pair of transversely spaced, vertically extending rear flange portions 19 and 20. Each of these portions is provided with a pair of bores or openings 21. Bolts 22 are passed through the openings 21 in the flanges 19 and 20 and through the openings 17 in the flanges 16 on the engine, and provide means for rigidly securing the structural member or casting 18 to the front of the power plant. It will be noted in this respect that the bolts 22 provide the only connecting means between the structural member 18 and the power plant 12. The member 18 is provided, at its lefthand side, with a forwardly extending side wall 23, formed integral with the left-hand flange portion 19. This wall is formed integral with a transverse forward wall 24, which in turn is formed integral with an intermediate longitudinal wall 25 connecting with the left-hand side of the right-hand flange 20. A transverse rear wall 26 connects the flanges 19 and 20 and the walls 23 and 25, thus providing a box construction which is arranged directly ahead of the center of the power plant 12. The power plant at this point carries the usual drive pulley 27 carried at the forward end of the power plant crank shaft, as generally indicated in dotted lines at 28 in Figure 3. This pulley is adapted, in the usual manner, to drive the engine fan, not shown. An examination of the drawings will show that the structural member 18 is not connected to and does not journal the forward portion of the crank shaft 28. The absence of this connection facilitates ready removal of the front end construction as a unit, as will hereinafter appear.

The box construction of the member 18, as formed by the walls 23, 24, 25 and 26, includes a bottom portion 29. This portion is formed with a substantially central opening 30 which provides means for the escape of various particles that may collect in the pocket formed by the walls. The bottom portion 29, at the left side of the vehicle, slopes upwardly toward the side wall 23 and is formed with an opening 31. This opening provides appropriate access to the usual cooling system drain, not shown.

As best shown in Figure 4, the structural member 18 extends laterally to one side of the power plant and is formed with an integral enlarged housing 32 formed with an opening 33 at its under side. This housing is appropriately connected by a pair of integral webs 34 with the flange portion 20. The housing is provided at its right-hand side, as viewed from the rear of the vehicle, with a secondary, cylindrical housing portion 35 open at its inner side, as at 36, to the inner portions of the housing 32. This arrangement is best shown in Figures 3 and 8. The front wall 24 of the member 18 terminates at its upper portion in a generally horizontal flange 37 provided with generally flat transversely spaced mounting pads 38. The portion of the wall 24 and horizontal flange 37 intermediate the mounting pads 38 is provided with a pair of transversely spaced, longitudinally extending bosses 39, and each boss is provided with a longitudinally extending threaded opening 40. This portion of the front wall 24 is in longitudinal alinement with the center line of the crank shaft 28 of the power plant 12. A vertical plate member 41 is secured to the bosses 39 by a pair of bolts 42 and extends downwardly in front of the wall 24 to a point just below the bottom portion 29. This arrangement is best shown in Figures 3 and 4. The plate 41 is provided with an opening 43 through which may be passed, in the usual manner, the rearward end of a starting crank, not shown. The bottom portion of the plate 41 terminates in a horizontal flange portion 44, the purpose of which will presently appear.

As best shown in Figure 6, the innermost reenforcing web 34 and the wall 25 of the box construction of the member 18 provide, in connection with the flange portion 20 and the wall portion rearwardly of the right-hand mounting pad 38, a pocket 45 having a bottom portion provided with an opening 46 to permit the escape of foreign particles that may collect therein. As previously mentioned, the front wall 24 extends transversely and connects with a forward portion of the housing 32. As best shown in Figures 4 and 6, the front wall 24 at this portion is provided with a longitudinally directed opening 46$^a$ generally in alinement with the lower bore 21 in the right-hand flange 20 on the member 18. This opening is considerably larger than the head of that particular bolt 22, and is provided for the purpose of facilitating the positioning of the bolt 22 to secure the member 18 to the power plant 12. In short, the particular arrangement permits the bolt 22 to be inserted completely through the opening 46 in order that it may be inserted through the openings 21 and 17 in the structural member and power plant flanges 20 and 16 respectively. The opening 46 is of a size sufficiently large to accommodate a socket wrench. This arrangement contributes also, of course, to the facility with which the front end construction may be removed from the vehicle body.

As previously mentioned, the housing portion 32 on the member 18 is provided at its under side with a circular opening 33. The housing 32 is provided with a finished face, arranged in a horizontal plane and surrounding the opening 33. The housing is further provided with a plurality of bosses 47 formed with vertically extending threaded bores 48 and vertically extending unthreaded bores 49. Each unthreaded portion 49 receives a dowel pin 50, there being two such pins in the contruction illustrated. A second structural member 51 is secured to the under side of the structural member 18. This second member is preferably in the form of a one-piece casting comprising an upper portion 52 having a circular finished surface 53 arranged in a horizontal plane and adapted to abut the surface provided at the under side of the housing 32. This portion on the member 51 is provided with a pair of bores 54 receiving the downwardly projecting ends of the dowel pins 50. The portion is further provided with a plurality of openings 55 through which bolts 56 are passed to be threaded into the threaded bores 48 of the housing portion 32 for securing the members 18 and 51 together. The portion 52 of the member 51 provides a cover portion which closes the opening at the bottom of the housing 32. The cooperation between the members in this respect will appear later in connection with the description of the tractor steering mechanism.

The member 51 includes a pair of longitudinally spaced, downwardly extending integral ear or trunnion portions 57. These ear portions 57 are provided with longitudinally alined bores 58 adapted to receive a longitudinally extending pivot pin 59 forming part of a tractor front axle structure 60. The pivot axis provided by the pivot pin 59 is arranged generally on the longitudinal center line between the rear wheels 14 of the rear axle structure 13; or, in other words, the pivot axis is arranged laterally to one side of the power plant 12.

The front axle structure 60 includes a transversely extending tubular axle 61, through which the pivot pin 59 is passed. This arrangement is best shown in Figures 3 and 5. The axle is provided at its pivot point with a pair of oppositely disposed sleeve portions 61ª for preventing longitudinal displacement of the axle between the ear portions 57. These sleeves are preferably welded to the tubular axle 61. As best shown in Figure 2, the axle 61 extends transversely of the tractor and carries at its outer ends vertical supporting standards 62, each of which is provided with a spindle portion 63 for journaling front wheels 64. The wheels 64 are transversely equidistant from the center line of the pivot pin 59. In other words, the front and rear axle structures have longitudinal center lines lying in a longitudinal vertical plane. Each standard 62 journals a vertical shaft 65, the lower end of which is rigidly connected to a respective spindle 63 and the upper end of which is rigidly connected to a forwardly extending steering arm 66. The two steering arms 66 are connected by a pair of tie-rods 66ª which extend inwardly toward the center line of the front axle construction, whereat they are connected together by a connecting member 67 pivotally carried at the forward end of a steering arm 68. This steering arm extends rearwardly through an opening 69 formed in the forward ear portion 57 of the structural member 51 and is at its rear end operatively associated with steering mechanism, to be presently described.

The housing 32 of the member 18 is provided at its inside, preferably integral with its upper wall, with a bearing supporting portion 70, into which is journaled an antifriction bearing 71 carrying the upper end of a vertically extending shaft 72. The portion 52 of the member 51 is provided with a sleeve portion 73 having an enlarged, recessed lower end fitted with an antifriction bearing 74. A lower portion of the shaft 72 is journaled in the bearing 74, and the shaft extends downwardly beyond the bearing 74, where it is rigidly connected to the steering arm 68. The shaft 72 has keyed thereto intermediate the antifriction bearing 71 and sleeve 73, a sector or gear portion 75.

As previously mentioned, the housing 32 includes the secondary housing portion 35, as best shown in Figure 8. This second housing portion journals therein a worm 76, the teeth of the worm extending through an opening 36 in the inner wall of the housing, previously referred to. The worm is rotated by a longitudinally rearwardly and upwardly extending steering rod 77 supported adjacent its rearward end by a bracket or standard 78 carried by the rearward body portion 11 of the tractor. The rearward extremity of the rod or shaft 77 is provided with a suitable steering wheel 79, by means of which the worm 76 is rotated, the worm thus cooperating with the sector 75 to steer the front wheels 64. There is thus provided steering mechanism for the front wheels including portions enclosed within the housing 63. The housing is entirely closed and is adapted to contain lubricant. For this purpose, the upper wall of the housing 32 is provided with a vertical filler opening 80 provided with a suitable plug 81.

The axle structure 60, by means of its pivot axis on the pin 59, is capable of vertical oscillating movement as the wheels follow the contour of the ground. It is desirable, however, that this vertical oscillating movement be confined within certain limits, and for this purpose the member 18 is provided with stop means for limiting such vertical movement in both directions. The provision of this stop means is best shown in Figure 4, wherein the casting or member 18 is illustrated as having at its bottom portion 29, a stop 82 in the form of an integral boss. A second stop is carried by the member 18 and takes the form of a U-shaped member 83 looped over the axle 61 and having its legs rigidly carried by the bottom wall portion 29 of the member 18 by means of a pair of nuts 84, the legs of the U-member extending through openings 85 provided in said bottom portion. The broken line positions of the axle 61 in Figure 4 illustrate the manner in which vertical movement of the axle is limited in both directions.

The member 18 is provided with attaching portions to which may be attached auxiliaries, such as implements or the like. For this purpose the side wall 23 of the member 18 is provided with a laterally extending boss 86, which is bored, as at 87, and provided with a vertical threaded bore 88 adapted to receive a set screw or locking stud 89. The opposite side of the member 18, at the housing 32, is provided with a similar means in the form of a laterally extending boss 90, bored, as at 91, and provided with a vertical threaded opening 92 adapted to receive a set screw or locking stud 93. As best shown in Figure 6, the bores 87 and 91 are transversely alined and it will be seen that implements, head lamps, or the like may be readily provided for attachment to the member 18.

The member 51 is also provided with means for attaching auxiliaries or implements. As previously mentioned, the member 51 includes the downwardly extending ears 57 which provide means for pivotally attaching the axle structure 60. The rearward ear 57 extends a considerable distance rearwardly of the housing 32 and is provided with an integral enlarged portion 94 formed with a transversely extending opening 95. This portion 94 is disposed between the axle 61 and a lower portion or crank-pan 12ª, which recedes rearwardly from the front of the engine to form substantially a pocket. The opening 95 is preferably square in cross-section to facilitate the attachment thereto of implements including square beams or mounting members. The enlarged portion 94 is provided with a plurality of rearwardly and upwardly extending bosses 96, each of which includes a threaded bore 97 adapted to receive a set screw or locking stud, as illustrated at 98 in Figure 5. This portion 94 further includes a pair of transversely spaced rearwardly extending apertured ears 99, serving to accommodate other auxiliaries or implements. It will thus be seen that the auxiliary attaching portions 86, 90, 95, and 99 are arranged independently of the power plant. The enlarged portion 94 is arranged generally on the longitudinal center line between the wheels 14 or 64.

Figures 1 and 2 illustrate the vehicle with an implement of the cultivator type attached thereto. For this purpose the cultivator unit may include a transverse beam 100, which is fitted into the transverse opening 95 of the member 51. The set screws 98 are used to lock the beam in place. The right-hand end of the beam 100 has welded thereto a plate 101, to which is pivotally connected a parallel link arrangement 102, having at its lower end an upstanding member 103 of a longitudinally extending cultivator beam 104. The beam is provided with a plurality of suitable cultivator shovels 105. The rear body portion 11 of the tractor is provided with a suitable lifting means including a hand lever 106 arranged within convenient access to an operator on the operator's station seat 15. The cultivator unit is but one of a number of implements that may be attached to the tractor through the medium of the attaching means provided on the structural members 18 and 51.

The tractor body 10 includes a generally conventional hood structure 107 including a forwardly disposed grille structure 108. The grille is suitably secured by a bolt 109 to the flange portion 44 on the plate member 41 previously described as bolted to the bosses 39 of the front wall of the member 18. The hood and grille structure is preferably provided as a unit, the rearward portion of the hood being appropriately associated with a fuel tank 110 supported on a standard 111, carried by the rearward body part 11 of the vehicle. A conventional radiator 112 is disposed ahead of the power plant 12 and is suitably carried by bolts 113 on the mounting pads 38, previously described.

From the foregoing description it will be seen that a simplified front end construction has been provided for a vehicle, which construction has been illustrated as being particularly adapted to a tractor of the agricultural type. The entire front end construction may be readily removed from the remainder of the vehicle body merely by removing the four bolts 22, by which the member 18 is secured to the flange portions 16 of the power plant 12. In this manner, the same vehicle body may be utilized as a different type tractor, the removed front end construction being replaced with a front end of a different type. It will be understood that in removing the front end structure the steering rod 77 is first freed from its supporting standard 78 and the entire assembly removed from the vehicle. This arrangement facilitates easy repairs and replacement of parts and permits a certain desirable flexibility with respect to interchangeability of the unitary front-end construction. The two-piece construction further provides a comparatively light-weight and rigid arrangement especially adapted to a tractor of the type disclosed. The attaching portions on the members 18 and 51 provide means for attaching implements, whereas such attachments would otherwise be rendered difficult or impossible because of the frameless nature of the vehicle, it being appreciated that auxiliaries and implements could not be practicably attached directly to the power plant 12. The arrangement provides for a number of other features of greater or lesser importance, which will be apparent to those skilled in the art.

As stated above, only a preferred embodiment of the invention has been illustrated and described as consisting of the various features and elements of construction set forth. It will be understood, of course, that numerous modifications and alterations may be made in this preferred construction without departing from the spirit and scope of the invention as defined in the appended claims.

What is claimed is:

1. A front-end construction for a vehicle having a longitudinally disposed power plant, comprising a structural member secured to a front portion of the power plant, said member including an integral, hollow housing portion open at one side, steering mechanism enclosed in said housing, a cover secured over the opening in the housing and including an outer trunnion, and a steerable wheel structure carried on said trunnion and including steering means operatively connected to the aforesaid enclosed steering mechanism.

2. A front-end construction for a vehicle including a longitudinally disposed power plant, comprising a structural member arranged transversely across the vehicle at the front of the power plant and secured thereto, said member further including an integral, hollow housing portion open at one side, a cover rigidly secured to the housing and closing said opening, steering mechanism enclosed in the housing and including a shaft supported at one end by the housing and at its other end in the cover, and a steerable wheel structure carried by said cover and including steering means operatively connected to the aforesaid shaft.

3. In a vehicle having a longitudinal body including a forwardly disposed power plant, the combination with the power plant of a structural member arranged at the front end of the vehicle and secured to a forward portion of the power plant, said member including a housing disposed laterally to one side of the power plant, said housing having an opening at one side, a second structural member rigidly secured to the first member and including a cover portion closing the opening in said housing, steering gearing carried in the housing and supported partly by the cover portion, a front axle pivotally carried by the second member on a longitudinal axis for vertical oscillating movement and including steerable wheels, steering connections between the wheels and the aforesaid gearing, and stop means arranged on the first member and engageable with the axle structure to limit vertical movement thereof in either direction.

4. In a vehicle having a longitudinal body including a power plant having front-end flange portions, the combination with the power plant of a structural member including flange portions rigidly secured to the power plant flange portions, said member extending forwardly and to one side of the power plant and being formed at that side with a housing open at one side, a second structural member rigidly carried by the first member and including a portion closing the open side of said housing, a steerable front wheel assembly including an axle part carried by the cover portion on a longitudinal pivot axis at the aforesaid side of the power plant, and steering mechanism for the front wheel assembly having portions enclosed in the aforesaid housing.

5. In a vehicle including a longtitudinal body having a forwardly disposed power plant, a radiator ahead of said power plant, and a hood structure disposed over the engine and including a grille over the radiator, the combination with the vehicle body of a structural member rigidly carried by a forward portion of the power plant and supporting the radiator, said member including means supporting the grille, said member further including a housing portion arranged to one side of the power plant and generally outside the hood and grille structure, a front wheel assembly carried by the member and including a steerable wheel and steering mechanism for said wheel including a portion in said housing.

6. In a vehicle having a longitudinal body including a forwardly disposed power plant, the combination with the power plant of a structural member arranged at the forward end of the vehicle and secured to a front portion of the power plant, said member including a housing disposed to one side of the power plant and formed with an opening at one side, a second structural member rigidly secured to the first member below the housing portion and including a cover portion closing the opening in the housing, a transverse front axle structure pivotally carried on a longitudinal axis by the second member, an auxiliary attaching member carried by the second structural member and extending generally downwardly at the forward portion of the power plant, a pair of attaching members for mounting auxiliaries carried by the first structural member respectively at opposite sides of the power plant, steerable wheels on the front axle structure, and steering mechanism for said wheels including portions enclosed in the aforesaid housing.

7. In a vehicle including a longitudinal body having a forwardly disposed power plant, the combination with the power plant of a structural member arranged at the forward end of the vehicle and rigidly secured to a forward portion of the power plant, said member including a housing portion formed with an opening at one side, a cover member carried below said first member and closing said opening, said cover member including a rearwardly extending auxiliary attaching portion for mounting auxiliaries, and a steerable front wheel structure carried by said cover portion and including steering mechanism having portions enclosed within said housing.

8. In a vehicle having a power plant including front end flange portions, the combination therewith of a front end structural member having flange portions rigidly secured to the power plant flange portions, said member including an integral housing portion formed with an opening at its under side, a cover member rigidly secured to the housing and closing the opening, said cover member including a pair of spaced downwardly extending supporting portions, one of said portions being provided with an auxiliary attaching part, a front axle structure for the vehicle carried in part by the other portion and including steerable front wheels, and steering mechanism for said wheels including portions enclosed in said housing.

9. In a vehicle including a longitudinal body having a forwardly disposed power plant, the combination with the power plant of a front end structural member rigidly carried by the power plant, a transverse front axle structure arranged below the structural member and pivoted thereon on a longitudinal axis arranged generally at one side of the power plant and including a pair of wheels, said axle structure being thereby vertically movable with respect to the vehicle body, and a pair of stop means carried by the structural member at the power plant side of the pivot axis for limiting vertical movement of the axle structure in both directions.

10. In a vehicle having a longitudinal body including a forwardly disposed power plant, the combination with the power plant of a front end construction comprising a two-piece structure including a first member secured to the power plant and a second member secured to the first member, said second member including a downwardly extending portion spaced from the power plant and provided with a transversely extending opening to form a sleeve transversely of the tractor adapted for the connection of auxiliaries to the tractor, and a front axle structure carried by said portion independently of said lateral opening.

11. In an agricultural tractor of the frameless type having a longitudinal body including a forwardly disposed power plant including a crank pan assembly, and a front wheel assembly, the combination with the power plant of a unit front-end structure rigidly secured to a forward portion of the power plant independently of the crank pan assembly, said structure including integral portions connected to the front wheel assembly, said structure including other integral portions adapted for the mounting of agricultural implements.

12. In a row-crop tractor having longitudinally spaced front and rear axle structures each including transversely spaced wheels, the front wheels being steerable, a longitudinal body between said axle structures and positioned laterally to one side of the center line between the wheels, said body including a forwardly disposed power plant, the combination with said power plant of a front-end structure comprising a unitary structural member carried by the power plant, and a second structural member carried by the first member and including an auxiliary attaching portion disposed generally on the aforesaid center line, said second member being also connected to the front axle structure.

13. In a row-crop tractor having longitudinally spaced front and rear axle structures each including transversely spaced wheels, the front wheels being steerable, a longitudinal body between said axle structures and positioned laterally to one side of the center line between the wheels, said body including a forwardly disposed power plant, the combination with said power plant of a front-end structure carried by the power plant and connected to the front axle structure, said front-end structure including an auxiliary attaching portion disposed generally on the aforesaid center line, said structure further including a gear housing on said center line, and steering gear mechanism carried in said housing.

14. In a vehicle having a longitudinal body including a forwardly disposed power plant, the combination with the body of a structural member arranged at the forward end of the vehicle and including a housing disposed to one side of the power plant, a second structural member rigidly secured to the housing, a transverse front axle structure pivotally carried on a longitudinal axis by the second member, an auxiliary attaching member carried by the second member and extending generally downwardly at the forward portion of the power plant, a pair of attaching members for mounting auxiliaries carried by the first member respectively at opposite sides of the power plant, steerable wheels on the front axle structure, and steering mechanism for said wheels including portions enclosed in the aforesaid housing.

DAVID B. BAKER.
WILLIAM C. ROSENTHAL.